United States Patent

[11] 3,566,084

| | | |
|---|---|---|
| [72] | Inventor | James Power Watson |
| | | Jupiter, Fla. |
| [21] | Appl. No. | 723,442 |
| [22] | Filed | Apr. 23, 1968 |
| [45] | Patented | Feb. 23, 1971 |
| [73] | Assignee | RCA Corporation |

[54] DISCONTINUITY DETECTOR
9 Claims, 5 Drawing Figs.

[52] U.S. Cl............................................... 235/61.11,
178/17
[51] Int. Cl............................................... G06k 7/08
[50] Field of Search.................................... 340/173
(TPR), 174, (electrets); 178/17 (D), 18, 19, 20;
235/61.116, 61.11, 61.111, 61.115; 310/5, 6, 7;
252/62.9 (Inquired); 174/110.6; 324/61 (P), 72.5,
71 (EK)

[56] References Cited
UNITED STATES PATENTS

| | | | |
|---|---|---|---|
| 1,804,364 | 5/1931 | Parker............................ | 340/174 |
| 1,927,548 | 9/1933 | Hopfield........................ | 310/7 |
| 2,941,718 | 6/1960 | Lubkin.......................... | 235/61.11 |
| 3,043,505 | 7/1962 | Brown........................... | 235/61.116 |
| 3,132,242 | 5/1964 | Cutaia........................... | 235/61.116 |
| 2,526,642 | 10/1950 | Del Campo.................... | 310/7 |

*Primary Examiner*—Thomas A. Robinson
*Attorney*—H. Christoffersen

ABSTRACT: A detector for discontinuities in a moving medium using a probe having self-polarized material in operative association with a metal conductor connected to a voltage detector. In one form, the material is attached to the conductor, while in another form, the material is located on the other side of the medium from the conductor.

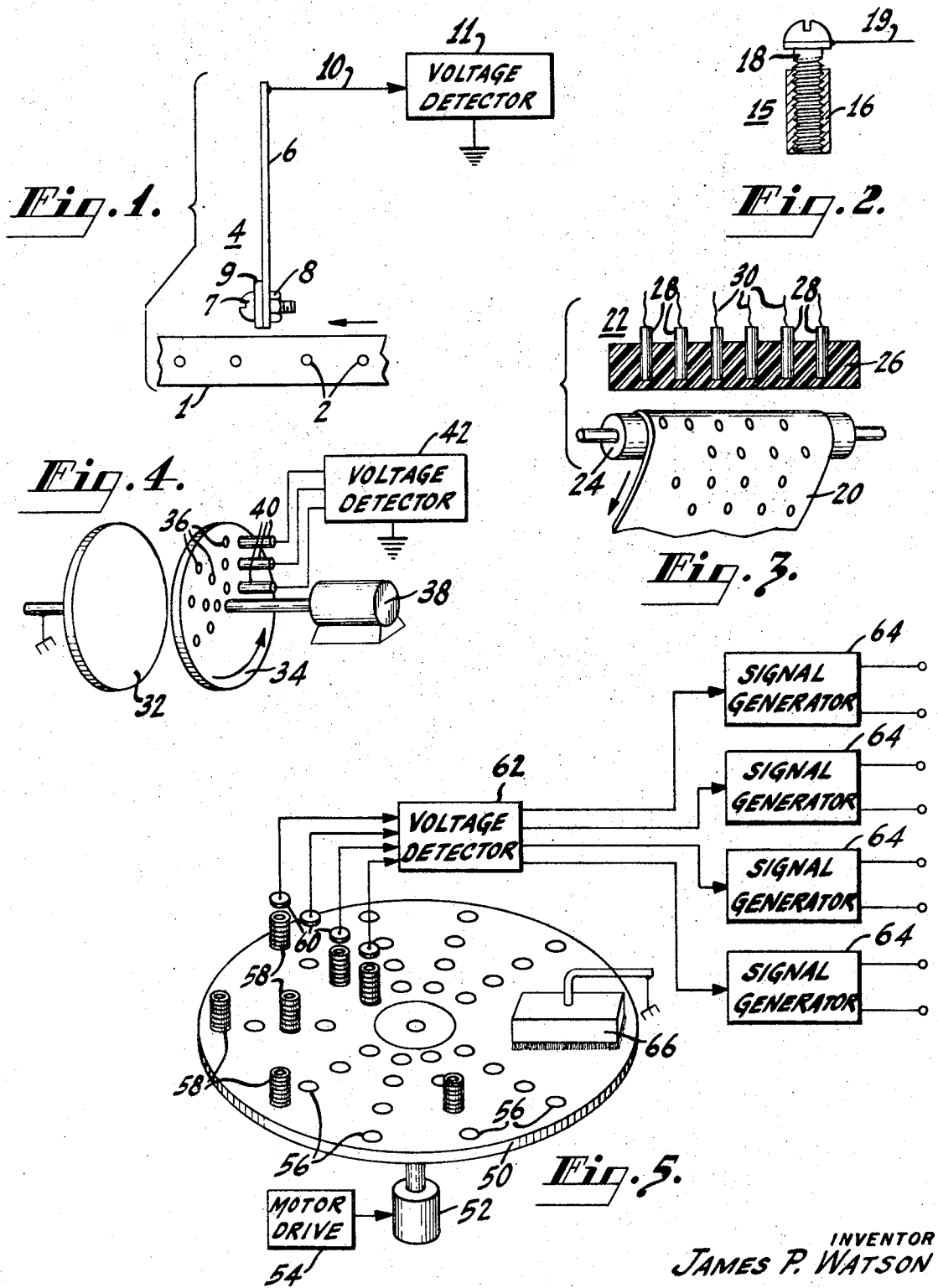

3,566,084

DISCONTINUITY DETECTOR

BACKGROUND OF THE INVENTION

The reading of punched holes in tapes and cards has often involved the use of photocells and light sources wherein the area of the record between holes acts as a light shutter. Such prior art hole detectors have inherent high maintenance problems which give rise to errors in processing of the punched record medium. Broadly speaking, such detectors are in the general field of edge, or discontinuity, detectors. The use of conventional mechanical switches or electronic probes as such detectors has imposed serious limitations on the speed and versatility of such detectors. Accordingly, it is desirable to provide a detector having very great versatility, no maintenance and a virtually unlimited operative life.

SUMMARY OF THE INVENTION

Apparatus embodying the invention includes a self-polarizing material in operative relationship with a metal signal conductor. A self-polarizing material is one which generates an external electrostatic field by virtue of molecular structure, processing, mounting, and other factors. In several embodiments, the self-polarizing material is mounted on the metallic conductor, while in other embodiments it is separated from the conductor and simply provides an electrostatic field linked to the metallic conductor. The self-polarizing material may be kept in an electrostatic field generating state by various means, such as mechanical abrasion.

BRIEF DESCRIPTION OF THE DRAWINGS

FIG. 1 is an illustration of one embodiment of the present invention;

FIG. 2 shows another probe structure also suitable for use with the embodiment of the invention shown in FIG. 1;

FIG. 3 is a pictorial view of another embodiment of the present invention;

FIG. 4 is an illustration of still another embodiment of the present invention; and FIG. 5 is a pictorial view of a modification of the embodiment shown in FIG. 4.

DETAILED DESCRIPTION

In FIG. 1, there is shown an embodiment of the present invention for detecting recorded data on a perforated record medium. A record medium 1, e.g., paper tape, having data perforations 2 therein is moved in the direction of the arrow by any suitable means (not shown). A probe, or pickup 4 is positioned above the record medium 1 and spaced therefrom. The probe 4 includes a metallic strip 6 suspended perpendicular to the motion of the tape 1. The end of the strip 6 nearest to the tape 1 has a machine screw 7 and nut 8 attached thereto. A piece of a suitable self-polarizing material, e.g., polytetrafluoroethylene 9 is held under the head of the screw 7 against the strip 6. The other end of the strip 6 is connected by an electrically conductive wire 10 to any suitable voltage responsive detector 11. The detector 11 has a connection to ground (or other reference) which preferably is the same ground reference used elsewhere in the system.

In operation, the self-polarizing material 9 is arranged to exhibit an electrostatic field either by virtue of its normal physical characteristics or in augmented form by a moderate tightening of screw 7 and nut 8 to squeeze the material 9. When the perforations 2 move past the probe 4, this electrostatic field is disturbed by the nonuniformity of the perforated tape 1. Thus, as each perforation 2 moves beneath the probe 4, a voltage step is generated above the normal electrostatic voltage level representative of a nonperforated area of the tape 1. These voltage steps, or pulses, are detected and amplified by the voltage detector 11 to produce discrete signals corresponding to respective ones of the perforations 2. The aforesaid theory of operation is presented as being the one which is believed to best explain the operation of the probe apparatus shown in FIG. 1. Other possible explanations have included one which attempts to explain the probe operation by likening it to an electret microphone, such devices being well-known in the art, which is disturbed to produce output signals by the air waves generated by the moving edges of the perforations 2. Accordingly, the inventor does not wish to be bound by any one explanation of the phenomenon exhibited by the probe 4 since it may be that the aforesaid perforation detection operation is actually a combination of several concurrent effects. Further, while the specific embodiment shown in FIG. 1 is a punched tape detector, it should be noted that the invention is clearly applicable to the sensing of punched cards. Additionally, the sensing of imperfections in other media, e.g., sheet steel, may be achieved by accommodating the width of the material 9 to the width of the material to be surveyed for discontinuities.

In FIG. 2, there is illustrated another pickup 15 suitable for use as the probe 4 shown in FIG. 1. Here, a sleeve 16 of self-polarizing material is mounted on one end of an electrical conductor, e.g., machine screw 18, to provide an electrostatic field as described above for the probe 4 shown in FIG. 1. An electrically conductive wire 19 is connected to the other end of the screw 18 to provide an electrical connection to associated equipment, e.g., the detector 11 shown in FIG. 1.

In FIG. 3, there is shown still another embodiment of the present invention for detecting the data recorded on a perforated record medium having multiple parallel tracks. A record medium, e.g., paper tape 20, is moved beneath a multiple track perforation detecting probe 22. A tape support roller 24 is shown solely for purposes of illustration and is not intended as a limiting structure on the probe 22 which can be used without a roller 24 beneath the tape 20 at the probe location. The probe 22 includes a block of self-polarizing material, e.g., polytetrafluoroethylene 26 supported above the tape 20 and spaced therefrom.

A plurality of electrically conductive rods 28 corresponding in number to the number of parallel data tracks on the tape 20 are inserted into respective holes in the block 26. The holes in the block 26 for the rods 28 may be arranged to be a tight fit for the rods 28 whereby the rods 28 are forced into the block 26. This forcing of the rods 28 into the holes in the block 26 stresses the block 26 and produces an augmented electrostatic field in the block 26 as previously explained in the operation of the probe 4 shown in FIG. 1. It has been found to be advantageous to have the holes in the block 26 terminate within the block 26, whereby a thin layer of polytetrafluoroethylene separates the internal ends of the rods 28 from the surface of the block 26 adjacent to the tape 20. The rods 28 are individually connected by respective wires 30 to associated equipment, such as the detector 11 shown in FIG. 1.

In FIG. 4, there is illustrated another embodiment of the present invention used as a signal generator. A disc 32 of self-polarizing material is fixedly supported behind a rotating disc 34. The rotating disc 34 has selectively arranged perforations 36 grouped along three exemplary concentric annular paths. The disc 34 is driven by a motor means 38. Three electrically conductive rods 40 are held adjacent to the disc 34 on the opposite side from the polytetrafluoroethylene disc 32. The rods 40 are each operatively associated with a respective one of the aforesaid annular hole paths on the disc 34. The rods 40 are each connected to a voltage detector 42. The rotation of the disc 34 produces a pattern of successive signal pulses from each of the rods 40 corresponding to the arrangement of the holes 36 in the respective ones of the annular hole paths. The disc 34 may be made of any suitable material including electrically conductive materials. In order to generate a new signal pattern, a new disc having a different hole pattern may be substituted for the previously used disc 34.

In FIG. 5, there is shown a modification of the signal generator structure illustrated in FIG. 4. A disc 50 similar to the disc 34 shown in FIG. 4 is rotatably driven by a motor means 52 supplied by a motor drive 54. Four concentric annular hole paths are shown in the disc. 50. Holes 56 in each of the paths are provided in the disc 50 in all of the desired locations in the four annular paths. Plugs 58 of a self-polarizing material are selectively inserted into desired ones of the holes 56, with a portion of each of the plugs 58 protruding from the same side of the disc.

Four signal detectors in the form of electrically conductive plates 60 are fixedly positioned along a radial line extending from the axis of rotation of the disc 50. The plates 60 are each aligned over a respective one of the annular row of holes 56, with the plates 60 being spaced from the disc 50 to prevent contact between the plugs 58 and the plates 60. The plates 60, in turn, are each connected to a voltage detector shown as a voltage detector 62. The separate output signals from the voltage detector 62, corresponding to the input signals from the plates 60, can be applied to corresponding signal generators 64 to produce output signals corresponding to the location of the plugs 58 in a respective one of the annular hole paths. A further means for maintaining a static field on the plugs 58 may be a brush, such as a mohair brush 66 located above the disc 50 with its fibers in light contact with the protruding ends of the plugs 58. It should be noted that while the present invention has been shown in several embodiments as a hole detector, it should be noted that in general, it functions as an edge, or discontinuity detector wherein a discontinuity in the adjacent environment is detected by the probe and represented by a voltage pulse.

I claim:

1. An arrangement for detecting discontinuities in the surface of an object comprising in combination:

a passive probe formed of a dielectric material of the type which in the absence of a voltage applied thereto or to the surface being sensed, generates a voltage pulse in response to the passage adjacent thereto of a surface discontinuity, whether that surface be a conductor or insulator, said probe being located adjacent to and spaced from said surface;

a voltage detector having a signal input terminal and a ground terminal;

solely a single wire connected to said passive probe, said single wire being connected to said signal input terminal of said voltage detector; and means for creating relative movement between said passive probe and surface while maintaining roughly the same spacing between said probe and surface.

2. An arrangement as set forth in claim 1 wherein said probe is formed of polytetrafluoroethylene.

3. An arrangement as set forth in claim 1 further including, at said probe, means stressing said polytetrafluoroethylene.

4. An arrangement as set forth in claim 1 wherein said probe comprises a dielectric sleeve, and further including a metal rod located within said sleeve and forming a tight fit therewith, said single wire being connected to said rod.

5. An arrangement as set forth in claim 4 wherein said sleeve is formed with internal threads and said rod comprises a threaded element screwed into said sleeve.

6. A detector of surface discontinuities comprising, in combination:

a block of polytetrafluoroethylene formed with a plurality of apertures therein extending only partially into the block; and a corresponding plurality of metal electrodes, each tightly fitted into an aperture.

7. Apparatus for detecting discontinuities in the surface of an object, comprising in combination:

a passive probe comprising a dielectric material of the type which, in the absence of a voltage applied thereto or to the surface being sensed, generates a voltage pulse in response to the passage adjacent thereto of a discontinuity in said surface of said object and including also a conductor in intimate contact with said dielectric material;

a voltage detector including a signal input terminal;

solely a single wire connecting said probe conductor to said voltage detector input terminal; and means for creating relative movement between said passive probe and surface in a direction along said surface.

8. The combination as set forth in claim 7, wherein said probe comprises a central cylindrical conductor surrounded by said probe material.

9. The combination as set forth in claim 8, wherein said dielectric material is formed with an opening therein into which said conductor is force fitted both for securing the conductor in place and for placing the dielectric material under stress, whereby the voltage output of the probe is augmented.